(12) United States Patent
Morikami

(10) Patent No.: US 6,450,846 B2
(45) Date of Patent: Sep. 17, 2002

(54) FLYWHEEL STRUCTURE OF OUTBOARD MOTOR

(75) Inventor: Tadaaki Morikami, Hamamatsu (JP)

(73) Assignee: Suzuki Kabushiki Kaisha, Hamamatsu (JP)

( * ) Notice: Subject to any disclaimer, the term of this patent is extended or adjusted under 35 U.S.C. 154(b) by 3 days.

(21) Appl. No.: 09/726,567

(22) Filed: Dec. 1, 2000

(30) Foreign Application Priority Data

Dec. 3, 1999 (JP) .......................................... 11-345289

(51) Int. Cl.[7] .............................................. B63H 5/125
(52) U.S. Cl. ......................................... 440/53; 440/900
(58) Field of Search ........................... 440/53, 900, 77; 123/406.58, 406.74

(56) References Cited

U.S. PATENT DOCUMENTS

| | | | | |
|---|---|---|---|---|
| 5,445,547 A | * | 8/1995 | Furukawa | 440/77 |
| 5,653,208 A | * | 8/1997 | Nakamura | 123/413 |
| 5,678,519 A | * | 10/1997 | Nakamura | 123/413 |

* cited by examiner

*Primary Examiner*—Ed Swinehart

(57) ABSTRACT

An outboard motor has an engine in which a crankshaft is disposed perpendicularly, a flywheel is disposed to an upper end portion of the crankshaft to be rotatable in unison with the crankshaft and the flywheel is provided with a detecting member a motion of which is detected by a sensor means for detecting a detecting number of revolution and a revolution angle of the crankshaft. The detecting member is disposed in an axial direction of the crankshaft.

6 Claims, 7 Drawing Sheets

FLYWHEEL STRUCTURE OF OUTBOARD MOTOR

BACKGROUND OF THE INVENTION

The present invention relates to a flywheel structure of an outboard motor.

In an engine of, for example, an outboard motor, an ignition plug generates spark to ignite air-fuel mixture in a cylinder to burn the mixture. This combustion in the engine is closely related to the ignition timing of the ignition plug, and in order to burn the mixture efficiently, it is necessary to appropriately set the ignition timing.

In the engine, a speed of a piston is increased as the engine revolution number is increased, and thus, it is common to set the ignition timing faster as the engine revolution number is increased.

An apparatus for automatically advancing the ignition timing in accordance with increase in the engine revolution number is called an automatic (spark) advance system (automatic timer). Conventionally, a mechanical automatic advance system utilizing a difference in centrifugal force caused by revolution of the engine has been used in many cases. Recently, in order to set more appropriate the ignition timing, there has been used an electronic automatic advance system utilizing the revolution number and revolution angle of the engine (crankshaft), opening degree of a throttle and the like as parameters to set the ignition timing that is more suitable for a driving state by means of a microcomputer.

In the case of an engine mounted in the outboard motor, in which a crankshaft is disposed perpendicularly, the revolution number and a revolution angle of the crankshaft are obtained by detecting, by using a detection sensor or the like, a motion of the detection member such as a trigger pole or the like provided on a flywheel provided on an upper end of the crankshaft so that they are rotated in unison (e.g., see Japanese Patent Laid-open Publication No. HEI 10-22026).

In a known structure, the trigger pole projects from an outer peripheral surface of the flywheel diametrically outward of the flywheel, and the detection sensor is disposed outside the trigger pole.

When the crankshaft also functions as a driving shaft for a camshaft, the detecting member is disposed below a drive pulley around which a timing belt is wound or the detecting member is disposed between the flywheel and the drive pulley.

The flywheel is provided with a magneto or a ring gear that is operatively connected to a drive gear of a starter motor so as to be rotatable in unison.

However, in the case of an engine in which a flywheel is provided with a ring gear, if a trigger pole, as a detecting member, projects from the outer peripheral surface of the flywheel, the detection sensor and the ring gear disposed outside the trigger pole may adversely interfere with each other. Therefore, the ring gear must consequentially be disposed at a higher position. As a result, a position of the center of gravity of the engine becomes higher, vibration of the crankshaft is increased, and there is an adverse possibility that durability of the crankshaft and its bearing may be lowered.

Further, in the case of an engine in which the detecting member is disposed below the drive pulley or between the flywheel and the drive pulley, a special procedure may be necessary for guiding the timing belt, or the diameter of the detecting member is reduced and the precision of the position (angle) of the detecting member is lowered.

Furthermore, since the diameter of the detecting member is reduced, the starting revolution number (controllable revolution number) of the engine is increased, and the starting performance is deteriorated.

In the case of an engine having a flywheel provided with a magneto, the magneto and the engine are heated to increase a temperature around the engine, which speeds up deterioration of an electrical equipment disposed therearound. Further, a wire used for a stator coil of the magneto must have high heat resistance, which will increase costs.

SUMMARY OF THE INVENTION

The present invention has been accomplished in view of the above-described circumstances, and it is an object of the present invention to provide a flywheel structure of an outboard motor capable of lowering the center of gravity of an engine and enhancing the starting performance of the engine.

It is another object of the present invention to provide a flywheel structure of an outboard motor capable of facilitating the cooling operation around the flywheel.

These and other objects can be achieved according to the present invention by providing a flywheel structure of an outboard motor in which a crankshaft is disposed perpendicularly in an engine, a flywheel is disposed to an upper end portion of the crankshaft to be rotatable in unison with the crankshaft and the flywheel is provided with a detecting member a motion of which is detected by a sensor means to thereby detect the number of revolution and a revolution angle of the crankshaft, wherein the detecting member is disposed in an axial direction of the crankshaft.

In a preferred embodiment, the detecting member is arranged on a lower surface of the flywheel along a circumferential direction thereof, the detecting member is formed, at an outer end thereof, with a centrifugal fan-shaped portion for discharging an air inside of the detecting member to an outside thereof when the flywheel is rotated.

The flywheel is provided at, an outer peripheral edge portion thereof, with a ring gear for starting an engine, the detecting member and the sensor means are disposed inside of an outer diameter of the ring gear in a plan view.

Three or more numbers of the detecting members are arranged on the lower surface of the flywheel at an equal distance from one another in the circumferential direction thereof, a notch is formed to each of the detecting members by removing a portion thereof.

The flywheel is provided, at an upper surface thereof, with a fan member for introducing an air outside the flywheel into the flywheel.

The detecting member has a size K in a diametrical direction thereof, which is set to be equal to or greater than a size S of the detecting member in the circumferential direction thereof.

The detecting member is a trigger pole projecting downward towards the engine and the sensor means comprises a pulser coil disposed to the engine.

As explained hereinabove, according to the present invention, in a flywheel structure of an outboard motor for detecting, by using a sensor means, a motion of a detecting member provided on a flywheel which is formed on an upper end of a crankshaft so that the flywheel is rotated in unison with the crankshaft, thereby detecting the number of revolution and a revolution angle of the crankshaft, and the detecting member is disposed in an axial direction of the crankshaft. Therefore, the position of the ring gear can be set lower, and the position of the center of gravity of the engine can be lowered.

The detecting member is disposed on a lower surface of the flywheel in its circumferential direction, the detecting member is formed at its outer end with a centrifugal fan-shaped portion for discharging the air inside the detecting member to the outside of the detecting member when the flywheel is rotated. Therefore, the space surrounded by the flywheel and the engine can be cooled efficiently with a simple structure.

Further, the flywheel is provided, at its outer peripheral edge, with a ring gear for starting an engine, the detecting member and the sensor means are disposed inside of an outer diameter of the ring gear as viewed from above. Therefore, the layout can be made compact.

Furthermore, the number of the detecting member is three or more, which are disposed on the lower surface of the flywheel at at equal distance from one another in its circumferential direction, and a notch is formed on each of the detecting members by removing a portion thereof. Therefore, wind noise generated by the detecting means at a time when the flywheel is rotated can be reduced.

Furthermore, the flywheel is provided at its upper surface with a fan structure for introducing air outside the flywheel into the flywheel. Therefore, the space surrounded by the flywheel and the engine can be cooled efficiently with a simple structure.

Further, a size of each of the detecting members in its diametrical direction is set to be equal to or greater than a size of the detecting member in its circumferential direction. Therefore, cranking noise generated when the engine is started is reduced.

The nature and further characteristic features of the present invention will be made clear from the following descriptions made with reference to the accompanying drawings.

DESCRIPTION OF THE PREFERRED EMBODIMENT

An embodiment of the present invention will be explained based on the drawings below.

Figure 1:
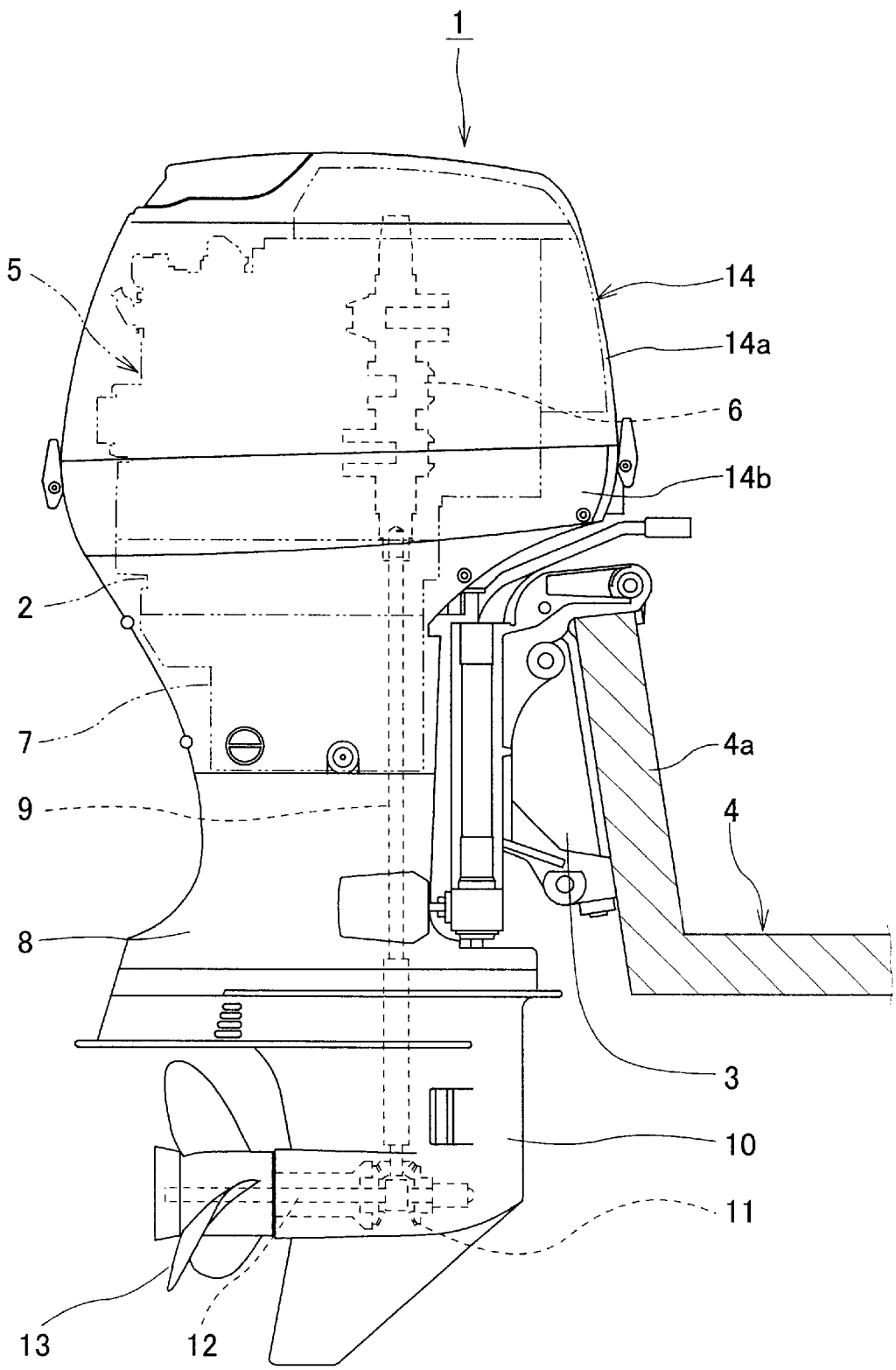
FIG. 1 is a right side view of an outboard motor showing one embodiment of a flywheel structure of the outboard motor according to the present invention.

FIG. 1 is a right side view of an outboard motor to which the present invention is applied. As shown in FIG. 1, the outboard motor 1 is mounted to a transom 4a of a hull 4 through a bracket 3 mounted to an engine holder 2. An engine 5 is disposed on an upper portion of the engine holder 2.

Further, it is to be noted that the terms "upper", "lower", "right", "left" and the like mentioned herein are used in a state of the outboard motor in the illustrated state or mounted to a hull in a usable state.

A crankshaft 6 is vertically disposed in the engine 5 such that the crankshaft 6 is directed substantially in a vertical direction. A drive shaft housing 8 is disposed at a lower portion of the engine holder 2 through an oil pan 7.

A drive shaft 9 connected to a lower end of the crankshaft 6 extends downward in the oil pan 7 and the drive shaft housing 8. The drive shaft 9 drives a propeller 13 through a bevel gear 11 and a propeller shaft 12 arranged in a gear case 10 disposed in a lower portion of the drive shaft housing 8.

The engine 5 is covered with an engine cover 14. The engine cover 14 can be divided into an upper cover 14a and a lower cover 14b. An upper portion of the engine 5 is covered with the upper cover 14a. The engine holder 2, the oil pan 7 and a lower portion of the engine 5 are covered with the lower cover 14b.

Figure 2:
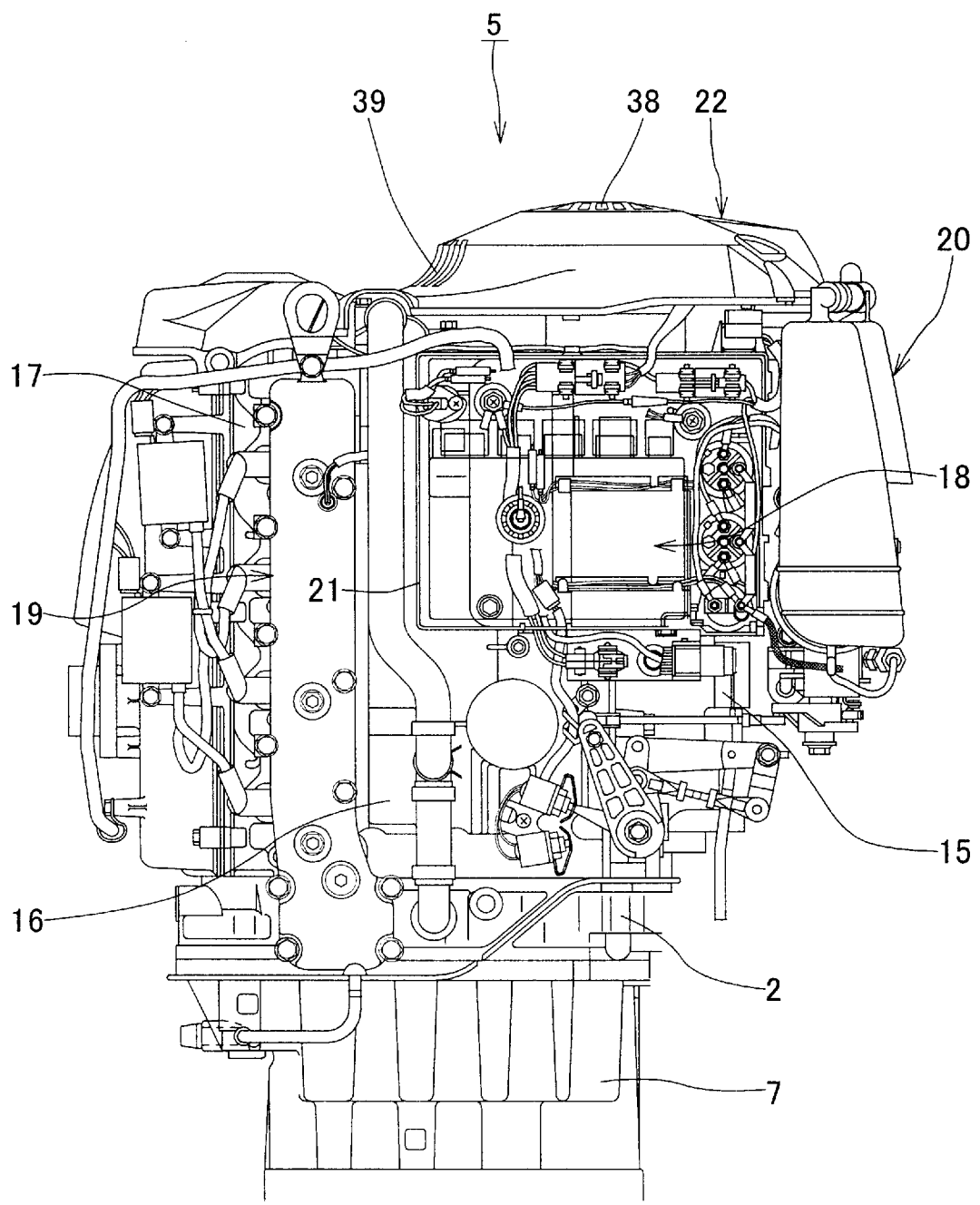
FIG. 2 is an enlarged right side view of an engine portion of the outboard motor shown in FIG. 1.
Figure 3:
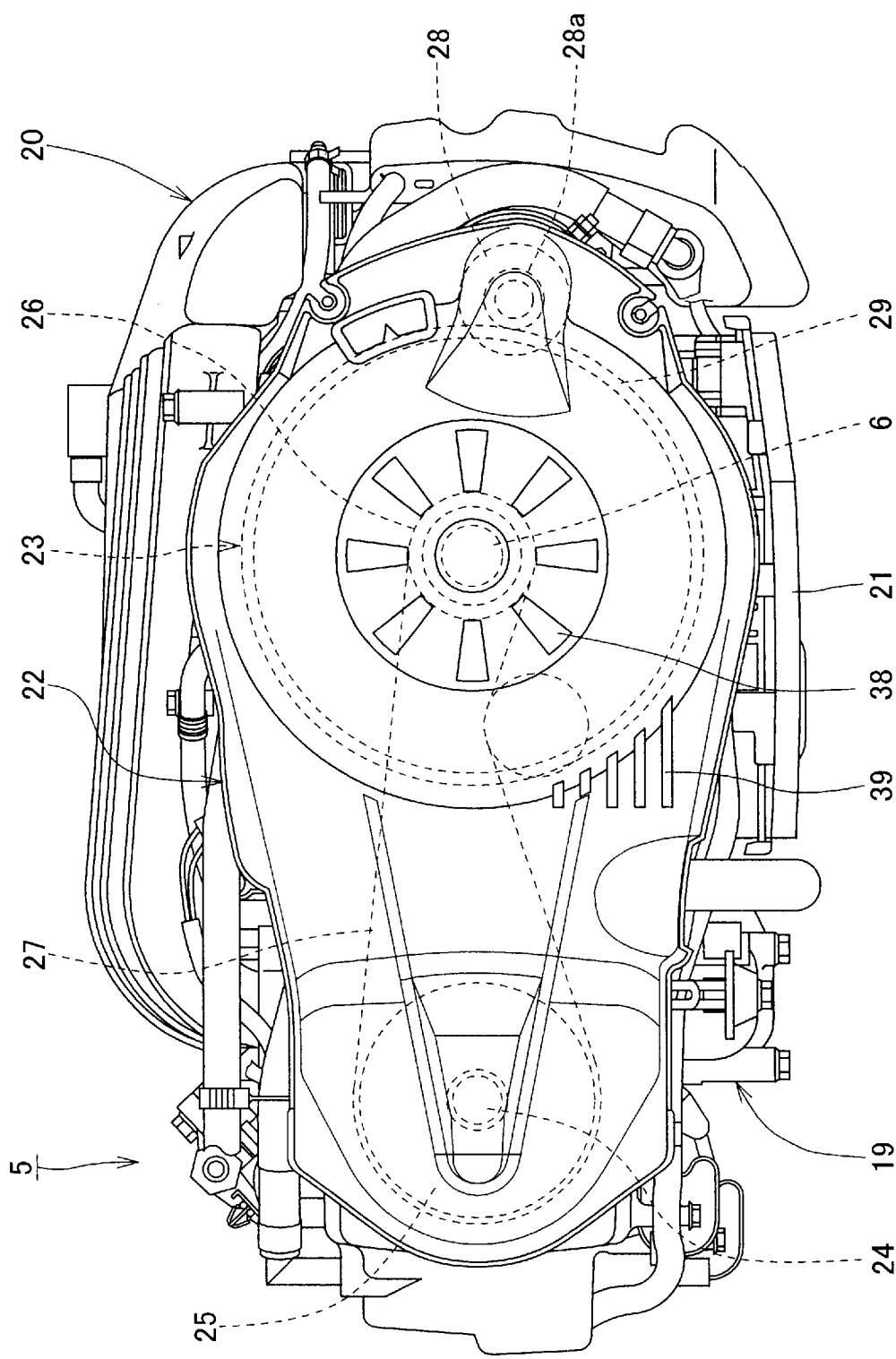
FIG. 3 a plan (top) view of the engine shown in FIG. 2.
Figure 5:
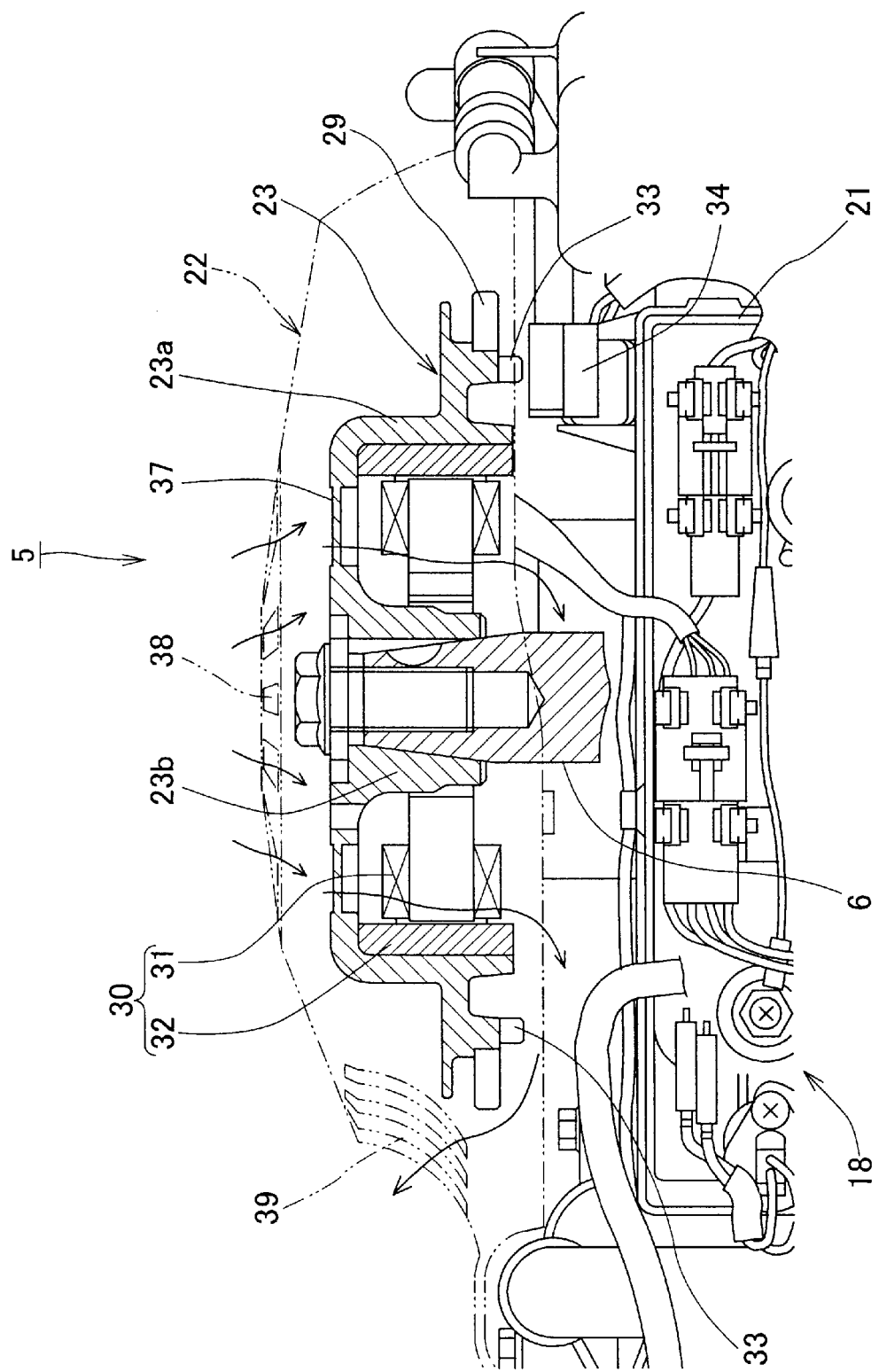
FIG. 5 is a sectional view taken along a V—V line in FIG. 4.

FIG. 2 is an enlarged right side view of a portion of the engine 5 shown in FIG. 5. FIG. 3 is a plan (top) view of the engine 5. As shown in FIGS. 2 and 3, the engine 5 is, for example, a water-cooled four-stroke-cycle four-cylinder engine and comprises a crankcase 15, a cylinder block 16, a cylinder head 17 and the like arranged in the longitudinal direction.

An electrical equipment 18, a discharge device 19, an intake device 20 and the like are disposed around the engine 5. The intake device 20 is unified and disposed from left side to a front portion of the engine 5, the discharge device 19 is disposed on the right side of the engine 5, and the electrical equipment 18 is accommodated in an electrical equipment box 21 disposed on the right side of the engine 5 like the discharge device 19. Each of devices (which will be described later) above the engine 5 is covered with a ring gear cover 22.

Figure 4:
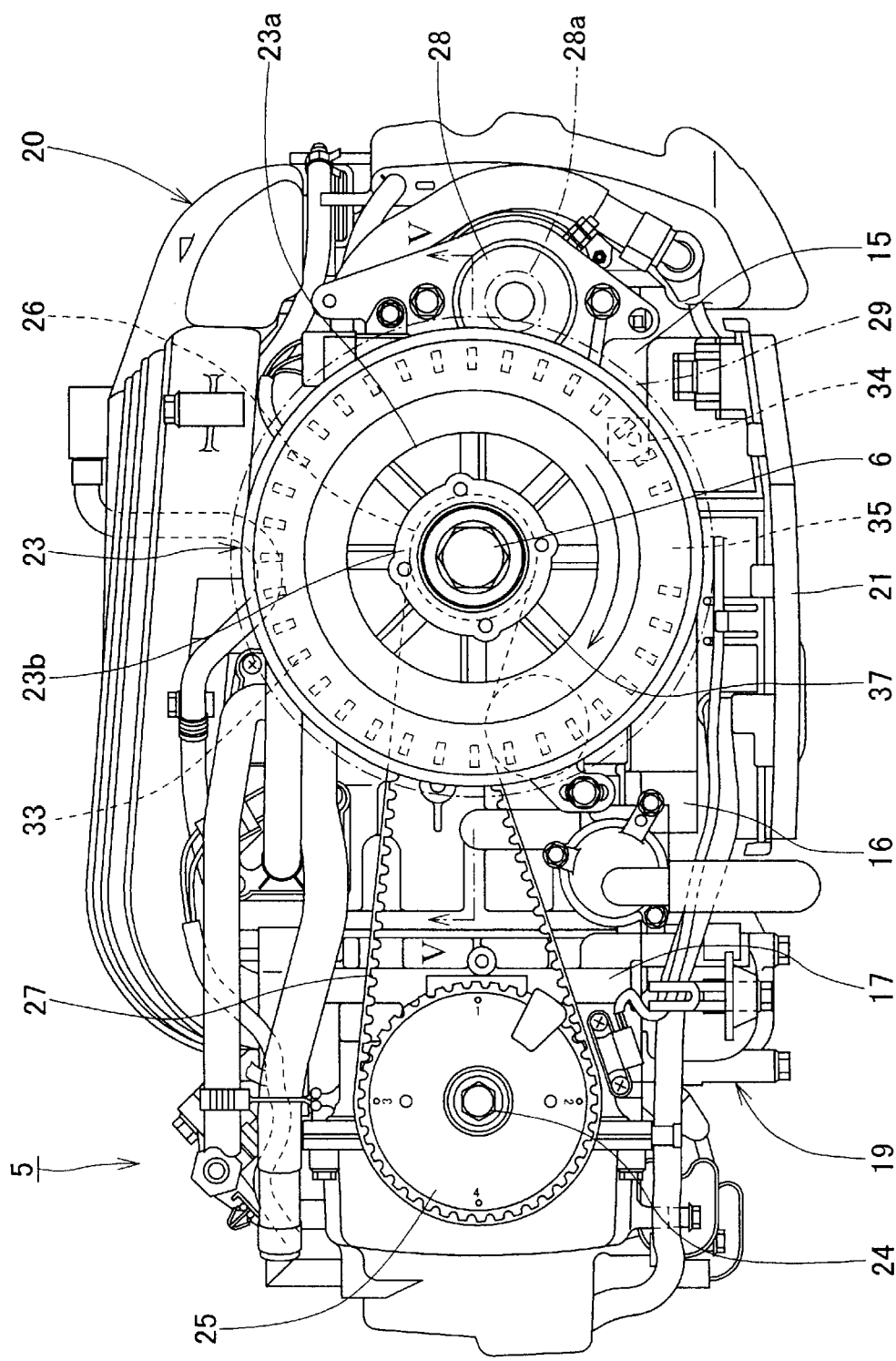
FIG. 4 is a plan (top) view of the engine in a state in which a ring gear cover is detached.

FIG. 4 is a plan (top) view of the engine 5 in which the ring gear cover 22 is detached, and FIG. 5 is a sectional view taken along a V—V line in FIG. 4. As shown in FIGS. 1 and 5, an upper end of the crankshaft 6 projects upward of the engine 5. The flywheel 23 is provided on the projected end to be rotatable with the crankshaft 6 in unison.

Although it is not described in detail, an upper end of a camshaft 24 for a valve moving mechanism provided in the cylinder head 17 in parallel to the crankshaft 6 also projects upward over the engine 5, and a driven pulley 25 is provided on the projected end such that the driven pulley 25 can rotate with the camshaft 24 in unison. A timing belt 27 is wound up around between the driven pulley 25 and a driving pulley 26 provided on the crankshaft 6, so that the rotation of the crankshaft 6 is transmitted to the camshaft 24.

The engine 5 is provided, at its front upper portion, with a starter motor 28 for starting the engine 5. The flywheel 23 is provided, at its outer peripheral edge, with a ring gear 29. A drive gear 28a of the starter motor 28 and the ring gear 29 are operatively connected to each other so that the rotation driving force of the starter motor 28 is transmitted to the crankshaft 6.

The flywheel 23, the starter motor 28, the ring gear 29, the driven pulley 25 and the timing belt 27 are covered with the ring gear cover 22.

As shown in FIG. 5, a magneto 30 is disposed in the flywheel 23. A central portion of the flywheel 23 is formed into an inverted-concave (gate) shape so as to cover the magneto 30 from above. The magneto 30 comprises a stator coil 31 fixed on the side of the engine 5, and a permanent magnet 32 disposed in the inverted-concave portion 23a of the flywheel 23 opposed to the stator coil 31. By rotating the flywheel 23, AC current is generated in the stator coil 31.

Figure 6:
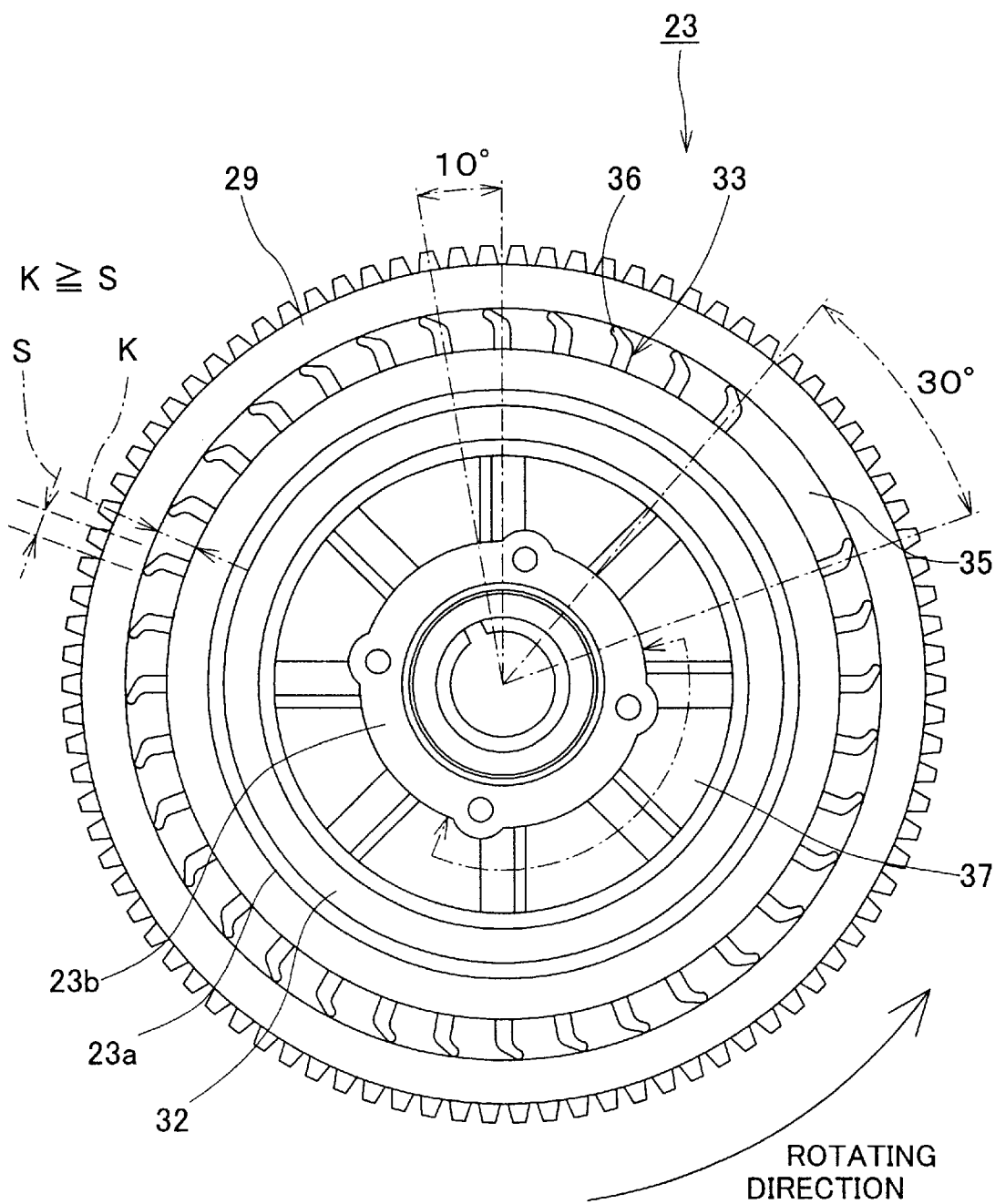
FIG. 6 is a lower surface view of a flywheel.

FIG. 6 shows a lower surface of the flywheel 23. As shown in FIGS. 5 and 6, trigger poles 33, as detecting members, are provided outside of an outer diameter of a mounting boss 23b of the flywheel 23 and inside of an outer diameter of the ring gear 29. The trigger poles 33 are disposed in an axial direction of the crankshaft 6 and project downward (towards the engine 5) in the present embodiment. A sensor means 34 (pulser coil), as a sensor means, is provided inside the outer diameter of the ring gear 29 on the engine 5 as viewed from above (i.e. in a plan view).

As shown in FIG. 6, the number of the trigger poles 33 is three or more, and the trigger poles 33 are disposed in and along the circumferential direction at an equal distance from one another, and in the present embodiment, the trigger poles 33 are arranged at 10° (crank angle) from one another. A portion (e.g., adjacent two) of the trigger pole 33 is removed, and a notch 35 having an angle of 30° (crank angle) is formed. In the present embodiment, a total 34 (thirty-four) triggers poles 33 are provided.

A size K of each of the trigger poles 33 in its diametrical direction is set to be equal to or greater than a size S of the trigger pole 33 in its circumferential direction (K≧S). A centrifugal fan-shaped portion 36 is formed on an outer end of the trigger pole 33 so that an air inside the trigger pole 33 to the outside of the trigger pole 33 when the flywheel is rotated.

Figure 7:
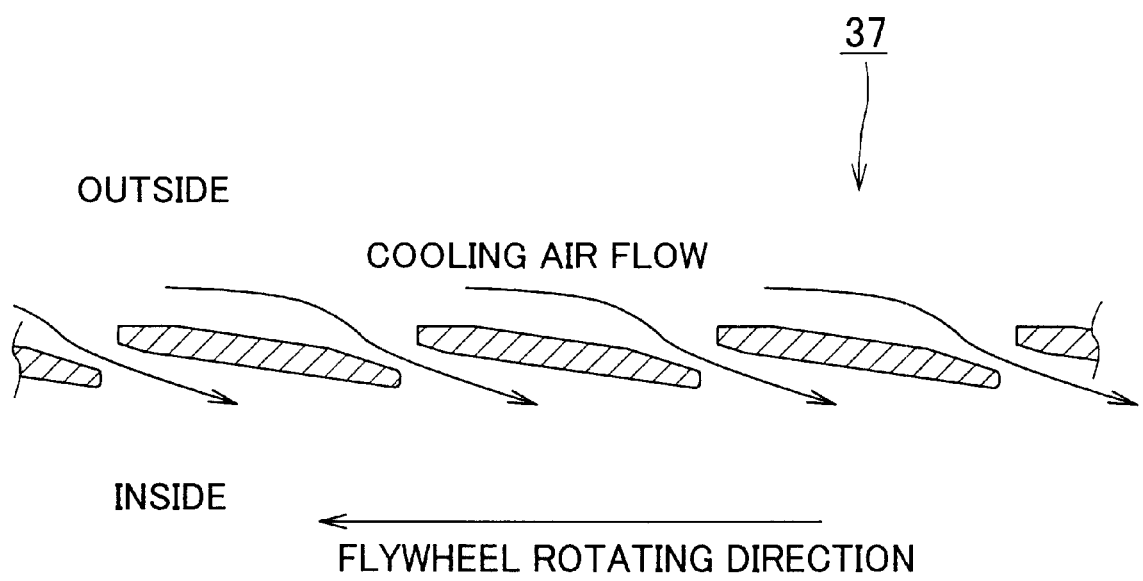
FIG. 7 is a sectional view taken along a VII—VII line in FIG. 6.

FIG. 7 is a sectional view taken along a VII—VII line in FIG. 6. As shown in FIGS. 5 to 7, an upper surface of the inverted-concave (gate-shape) portion 23a of the flywheel 23 covering the magneto 30 is provided with a fan structure 37 for introducing air outside the gate-shaped portion 23a thereinto. The ring gear cover 22 immediately above the fan structure 37 is formed with an intake port 38. A side surface of the ring gear cover 22 is formed with a discharge port 39.

An operation of the present embodiment will be explained hereunder.

When the engine 5 is started to rotate the crankshaft 6, the flywheel 23 is also rotated. When the flywheel 23 is rotated and each of the trigger poles 33 moves across above the detecting sensor 34, an electric signal (sensor signal) is outputted to the detecting sensor 34, and this electric signal is utilized for detecting the ignition timing.

When the flywheel 23 rotates, the fan structure 37 provided on the upper surface of the flywheel 23 introduces the outside air from the intake port 38 on the upper surface of the ring gear cover 22 into the inverted-concave portion 23a of the flywheel 23, thereby cooling the magneto 30 that is heated by power-generating operation and the upper portion of the engine 5.

The centrifugal fan-shaped portion 36, for discharging the air inside the trigger pole 33 to the outside of the trigger pole 33 when the flywheel 23 is rotated, is formed on the outer end of the trigger pole 33. Therefore, the air cooling the magneto 30 and the upper portion of the engine 5 is discharged from the discharge port 39 formed in the side surface of the ring gear cover 22.

Air flow as shown with arrow in FIG. 5 is generated by the fan structure 37 provided on the upper surface of the flywheel 23 and the centrifugal fan-shaped portion 36 provided on the outer end of the trigger pole 33. This air flow is further facilitated by the air discharged by the ring gear 29 so that space surrounded by the flywheel 23, and the engine 5 is cooled efficiently.

Since the space is cooled efficiently, a temperature of the stator coil 31 is prevented from increasing, the durability of the stator coil 31 is enhanced, and costs required for a wire (not shown) used for the stator coil 31 are reduced.

Conventionally, since the trigger pole projects on an outer peripheral surface of the flywheel, the detection sensor and the ring gear disposed outside the trigger pole may adversely interfere with each other and thus, the ring gear must be disposed at a higher position. However, in the present invention, the trigger pole 33 provided on the lower surface of the flywheel 23 is disposed in the axial direction of the crankshaft 6 so as to project towards the engine 5 disposed below. Therefore, it is possible to lower the position of the ring gear 29. As a result, the position of the center of gravity of the engine 5 is lowered, vibration of the crankshaft 6 is reduced, the stress applied to the crankshaft 6 is reduced, and the durability of the crankshaft 6 and its bearing, not shown, is enhanced.

The trigger pole 33 is provided outside the outer diameter of the mounting boss 23b of the flywheel 23 and inside of the outer diameter of the ring gear 29. Therefore, a positional (angle) precision of the trigger pole 33 is enhanced, the angle speed is increased and thus, a sensor signal is outputted correctly even in a low revolution region of the engine 5, and the number of starting revolution of the engine 5 (controllable revolution number) is reduced, thus enhancing the starting performance of the engine 5.

Further, the size K of each of the detecting members 33 in its diametrical direction is set to be equal to or greater than the size S of the detecting member 33 in its circumferential direction (K≧S). Therefore, a time during which the trigger pole 33 and the detecting sensor 34 are opposed to each other is shortened, and cranking noise (meshing noise) generated when the engine 5 is started is reduced.

Further, since a portion of the trigger poles 33 which are arranged at equal distances from each other in the circumferential direction is removed so as to form the notch 35, wind noise generated at a time when the trigger pole 33 functions as a centrifugal fan is reduced.

Since the trigger pole 33 is provided inside the outer diameter of the ring gear 29, an escape shape is unnecessary for the ring gear cover 22, and the shape of the ring gear cover 22 is simplified, and the entire structure can be made compact.

Further, since the trigger pole 33 is disposed in the axial direction of the crankshaft 6, the detecting sensor 34 can also be disposed in the axial direction of the crankshaft 6. As a result, a position of the detecting sensor 34 can be lowered, and noise caused through the vibration of the engine 5 and the like can be suppressed from entering into the detecting sensor 34.

What is claimed is:

1. A flywheel structure of an outboard motor, in which a crankshaft is disposed perpendicularly in an engine of an outboard motor in an state installed to a hull, a flywheel is disposed to an upper end portion of the crankshaft to be rotatable in unison with the crankshaft and the flywheel is provided with a detecting member a motion of which is detected by a sensor to thereby detect the number of revolution and a revolution angle of the crankshaft, wherein said detecting member is disposed in an axial direction of the crankshaft and arranged on a lower surface of the flywheel along a circumferential direction thereof, said detecting member is formed, at an outer end thereof, with a centrifugal fan-shaped portion for discharging an air inside the detecting member to an outside thereof when the flywheel is rotated.

2. A flywheel structure of an outboard motor according to claim 1, wherein said flywheel is provided at, an outer peripheral edge portion thereof, with a ring gear for starting an engine, said detecting member and said sensor means are disposed inside of an outer diameter of said ring gear in a plan view.

3. A flywheel structure of an outboard motor according to claim 1, wherein three or more numbers of said detecting members are arranged on the lower surface of the flywheel at an equal distance from one another in the circumferential direction thereof and a notch is formed to each of the detecting members by removing a portion thereof.

4. A flywheel structure of an outboard motor according to claim 1, wherein said flywheel is provided, at an upper surface thereof, with a fan member for introducing an air outside the flywheel into the flywheel.

5. A flywheel structure of an outboard motor according to claim 1, wherein a size K of said detecting member in a diametrical direction thereof is set to be equal to or greater than a size S of said detecting member in the circumferential direction thereof.

6. A flywheel structure of an outboard motor according to claim 1, wherein said detecting member is a trigger pole projecting downward towards the engine and the sensor means comprises a pulser coil disposed to the engine.

* * * * *